US005771567A

United States Patent [19]
Pierce et al.

[11] Patent Number: 5,771,567
[45] Date of Patent: Jun. 30, 1998

[54] METHODS OF FABRICATING CONTINUOUS TRANSVERSE STUB RADIATING STRUCTURES AND ANTENNAS

[75] Inventors: Brian M. Pierce, Moreno Valley; Norman H. Harris, Newhall; Thomas Kirk Dougherty, Playa del Rey; William W. Chen, Westchester; Florentino V. Lee, Culver City, all of Calif.

[73] Assignee: Raytheon Company, Lexington, Mass.

[21] Appl. No.: 705,508

[22] Filed: Aug. 29, 1996

[51] Int. Cl.⁶ ................................................. H01P 11/00
[52] U.S. Cl. ............................................ 29/600; 29/25.35
[58] Field of Search ................................. 29/25.35, 603, 29/600

[56] References Cited

U.S. PATENT DOCUMENTS

| | | | |
|---|---|---|---|
| 4,617,707 | 10/1986 | Mohaupt et al. | 29/25.35 |
| 4,726,099 | 2/1988 | Card et al. | 29/25.35 |
| 5,154,973 | 10/1992 | Imagawa et al. . | |
| 5,359,760 | 11/1994 | Busse et al. | 29/25.35 |
| 5,443,746 | 8/1995 | Harris et al. . | |
| 5,557,286 | 9/1996 | Varadan et al. . | |
| 5,660,877 | 8/1997 | Venkataramani et al. . | |

FOREIGN PATENT DOCUMENTS

| | | | |
|---|---|---|---|
| 57-87188 | 5/1982 | Japan | 29/25.35 |
| 57-190377 | 11/1982 | Japan | 29/25.35 |

*Primary Examiner*—Carl J. Arbes
*Attorney, Agent, or Firm*—Leonard A. Alkov; Glenn H. Lenzen, Jr.

[57] ABSTRACT

Methods of fabricating a porous ceramic composite having voltage-variable dielectric properties. The composite is made as follows. A polycrystalline ferroelectric powder, which is a ferroelectric perovskite such as barium strontium titanate, for example, is provided. The powder, a binder and a filler are then mixed in water to form a slurry. The powder-binder-filler slurry is then dried. The dried powder-binder-filler slurry is granulated. The granulated powder-binder-filler is pressed into a die. The binder and filler are then burned out to form a fragile porous ash-like structure. The porous structure is then sintered to form porous ceramic parts. The porous ceramic parts are then machined tiles. The machined porous tiles may then be tested for microwave properties. Fabrication methods for producing porous ferroelectric ceramic-polymer composite tiles or subaperture blanks and continuous transverse stub electronically scanned antenna plates or subapertures are also disclosed.

8 Claims, 4 Drawing Sheets

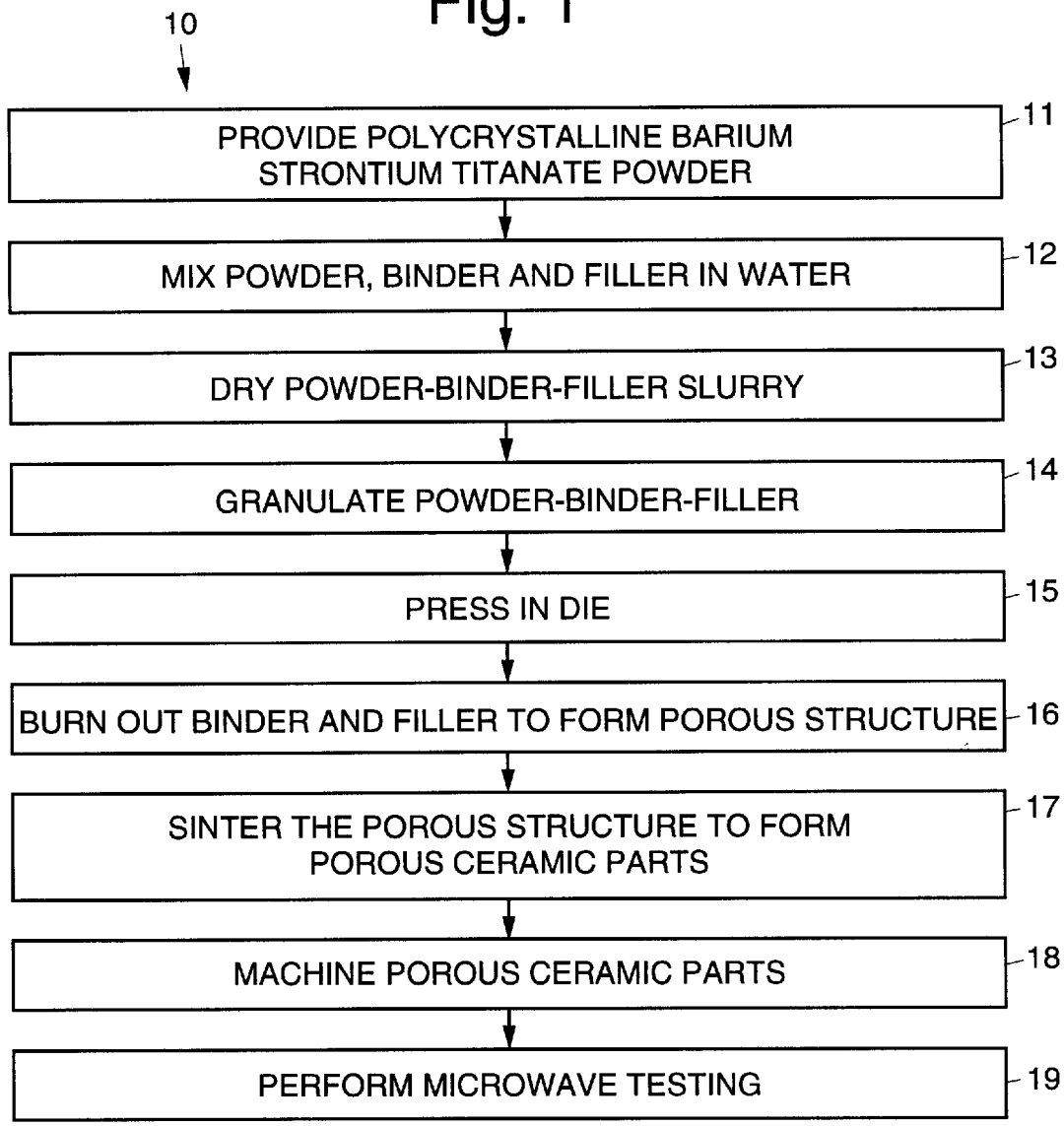

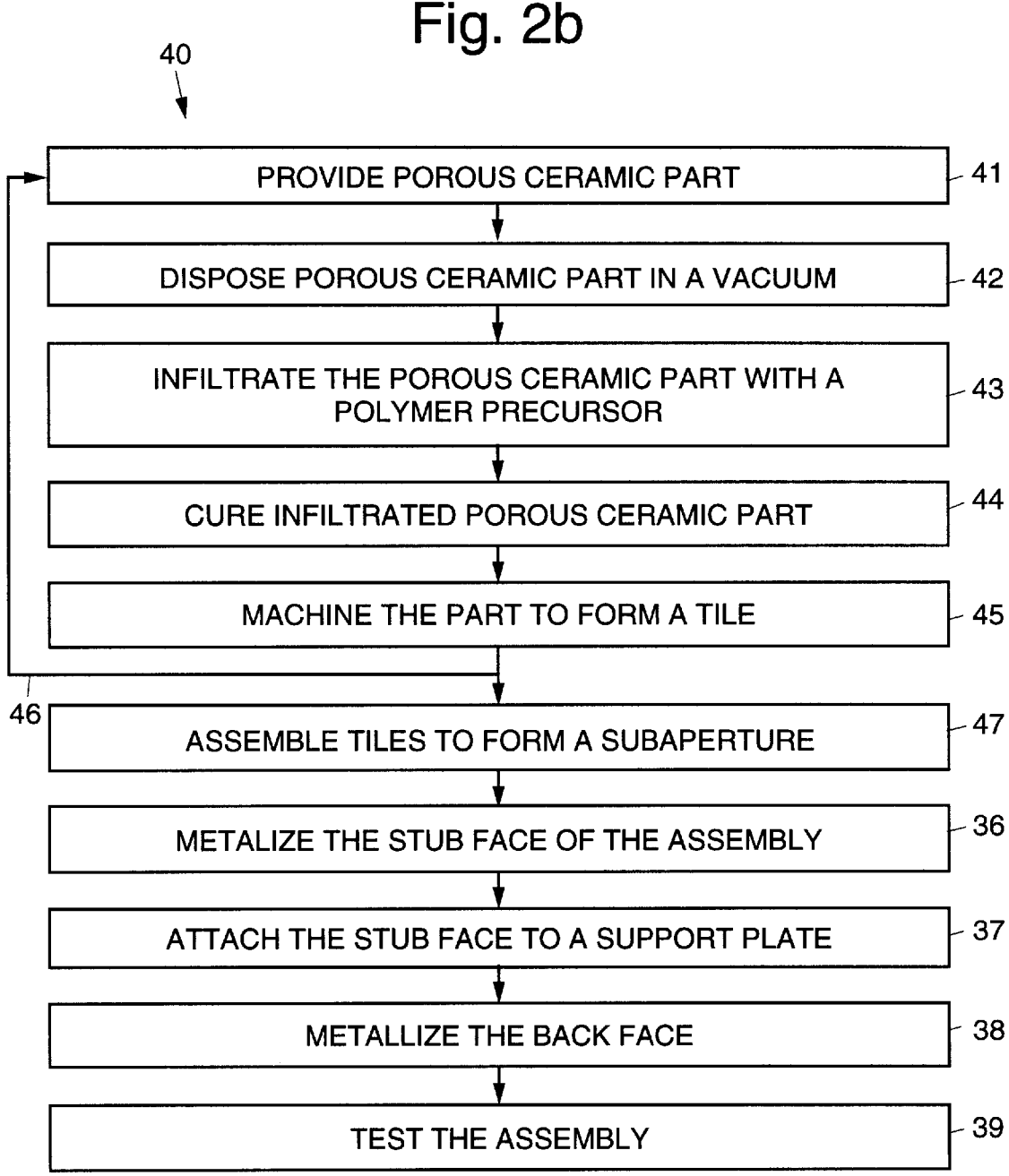

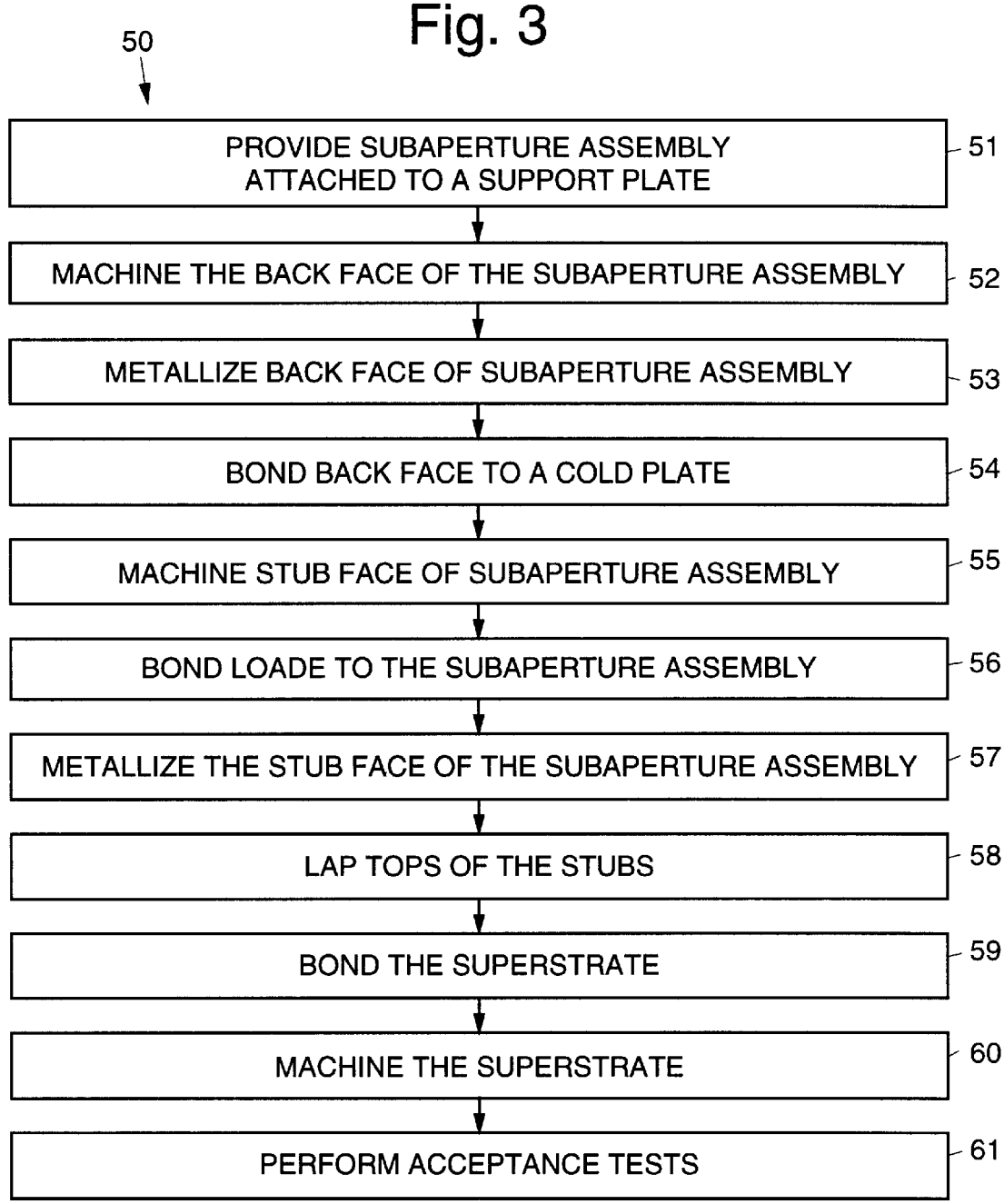

METHODS OF FABRICATING CONTINUOUS TRANSVERSE STUB RADIATING STRUCTURES AND ANTENNAS

BACKGROUND

The present invention relates to ferroelectric (or paraelectric) ceramic-polymer composites with voltage-variable dielectric properties, and more particularly, to a method for preparing such composites employing a combination of solution-gelation synthesis of ferroelectric powder, porous ceramic processing using either solution-gelation-or carbonate-derived ferroelectric powder and polymer infiltration, and methods of making structures using same.

A voltage-variable dielectric material is one where the real part of the relative dielectric constant, $\epsilon'$, changes in response to a voltage (or electric field) applied to the material. Continuous transverse stub electronically-scannable antennas may be fabricated from voltage-variable dielectric materials. U.S. Pat. No. 5,443,746 assigned to the assignee of the present invention discloses a tunable, solution-gelation-derived aerogel ferroelectric composite that was developed for use in voltage-variable dielectric material applications. Although this invention offered substantially increased performance for voltage-variable dielectric material applications, it had the disadvantage of using a specialized fabrication process.

The use of ferroelectric ceramics with voltage-variable dielectric properties for electronically scanned antenna applications at microwave frequencies has not been possible due to a lack of suitable fabricated materials. Voltage-variable dielectric refers to a change in real permittivity or real refractive index induced by the electric field resulting from an applied voltage bias. The properties needed for electronically-scannable antenna applications at frequencies in the range of 100 KHz to 12 GHz include a low real permittivity less than or equal to 50, a low loss tangent less than or equal to 0.010, a large electric field-induced change in refractive index less than or equal to 0.5 with a maximum applied electric field of less than or equal to 80,000 V/cm, a high dielectric breakdown strength of greater than 90,000 V/cm, and a spatial variation in dielectric constant less than 2% rms, i.e. a material homogeneity greater than 98% rms. Furthermore, the electric field-induced change in refractive index must be within 50 $\mu$sec, and display no hysteresis. No voltage-variable dielectric materials are known to exist that meet the above requirements.

Prior art approaches to provide materials with voltage-variable dielectric properties include six methods, none of which has been entirely satisfactory for 100 KHz to 12 GHz electronically scanned antennas. Five of the six methods involve the preparation of two-phase composites, where one phase is a ferroelectric ceramic such as barium strontium titanate ($Ba_xSr_{1-x}TiO_3$, where $0<x<1$) and the second phase is a ceramic or polymer filler with low dielectric losses at the microwave frequencies of interest. The ferroelectric phase imparts the voltage-variable dielectric property to the composite. Single phase, dense ferroelectric materials cannot be used because their real permittivities exceed greatly the required values.

The sixth method involves the preparation of liquid crystalline materials. Although liquid crystalline materials meet the requirement for low real permittivity, and come close to meeting the requirement for low loss, they cannot provide a large enough voltage-variable dielectric response within the allowed switching time of 50 $\mu$sec. Liquid crystalline materials cannot be used for 100 KHz to 12 GHz electronically scanned antenna applications.

The five methods based on composites containing a ferroelectric ceramic phase can be categorized according to the dimensionality of the connectivities of the two phases in the composite. A composite with an open pore structure like that in a sponge is said to be a 3-3 connectivity composite, i.e., both phases are connected in all three dimensions. A 1-3 connectivity composite has one phase connected along one dimension, and the second in all three dimensions, e.g., an array of aligned rods or columns distributed in a suitable matrix. A 0-3 connectivity composite has one phase completely disconnected, and the second phase connected in all three dimensions. Ferroelectric powder dispersed in a polymer matrix is an example of a 0-3 connectivity composite. A 2-2 connectivity composite has each phase connected in two dimensions, i.e., a laminated structure with alternating layers of the two phases.

Of the five methods that have been investigated to prepare microwave voltage-variable dielectric materials, the first two are 3-3 connectivity composites, the third is a 1-3 connectivity composite, the fourth is a 0-3 connectivity composite, and the fifth is a 2-2 connectivity composite. The two 3-3 connectivity composites are distinguished further by the natures of the two phases. The first 3-3 connectivity composite is a ferroelectric ceramic-polymer (e.g., Teflon) composite, and the second a ferroelectric ceramic-oxide ceramic (e.g., alumina) composite.

The 3-3 connectivity ferroelectric ceramic-polymer composites and ferroelectric ceramic-oxide ceramic composites that have been prepared to date do not meet the requirements for a low loss tangent, a large electric field-induced change in refractive index, and a low spatial variance in dielectric constant. There are several reasons why these composites have been deficient. One important reason is the use of relatively impure starting materials with purities no better than 98%. Other reasons include insufficient attention paid to keeping moisture out of the composite, a non-uniform microstructure for the porous ferroelectric ceramic phase with pore sizes that exceed the threshold for scattering of electromagnetic radiation at frequencies in the range of 100 KHz to 12 GHz, selection of a polymer or oxide ceramic phase that has too high a loss tangent at the operational frequencies, the incomplete infiltration of the polymer into the porous ferroelectric ceramic, and incomplete connectivity of the ferroelectric ceramic phase at the high (>70%) porosities needed to obtain a low real permittivity less than or equal to 50. When the ferroelectric ceramic phase becomes more disconnected, then the applied electric field moves more into the low dielectric filler phase, which reduces the electric field-induced change in refractive index of the composite. The field must then be increased to obtain at least some electric field-induced change in refractive index. This increased field then leads to a greater risk of dielectric breakdown. In conclusion, no method has been developed that prepares 3-3 connectivity ferroelectric ceramic-polymer or ferroelectric ceramic-oxide ceramic composites that meet the requirements for microwave electronically scanned antenna applications.

No 1-3 connectivity ferroelectric ceramic-filler composites have been prepared to date. Attempts have been made to prepare these composites, where the applied electric field is directed along the single axis of the connected ferroelectric phase. For example, backfilling a porous silica glass with a barium strontium titanate slurry proved unsuccessful because the surface tension of the slurry prevented complete filling of the pore. Another difficulty with 1-3 connectivity composites prepared to date is that pore diameters are relatively wide, which limits their performance to frequencies to less than about 5 GHz because of scattering concerns. Thus, no method has been developed that prepares 1-3 connectivity ferroelectric ceramic-filler composites, which meet the requirements for 100 KHz to 12 GHz electronically scanned antenna applications.

The 0-3 connectivity ferroelectric ceramic-filler composites that have been prepared to date have had some success in meeting the requirements for real permittivity and loss tangent, but fall short on those for the electric field-induced change in refractive index, and the spatial variation in real permittivity. The extremely low connectivity of the ferroelectric ceramic phase in the composite restricts the voltage-variable dielectric response to very low values. Furthermore, the spatial variance of the real permittivity for the composite is difficult to control because the ferroelectric powder has a tendency to separate from the less dense filler phase. Therefore, no method has been developed that prepares 0-3 ferroelectric ceramic-filler composites that meet the requirements for 100 KHz to 12 GHz electronically scanned antenna applications.

No 2-2 connectivity ferroelectric ceramic-filler composites have been prepared to date. If the applied electric field is directed perpendicular to the layers, then a simple analysis of capacitor layers in series shows that the voltage-variable dielectric response is virtually nonexistent. If the applied electric field is directed parallel to the layers, then a simple analysis of capacitor layers in parallel shows that the voltage-variable dielectric response can be significant. However, the loss tangent, real permittivity, and the spatial variance in real permittivity are higher than acceptable for the parallel electric field arrangement of the 2-2 connectivity composite. Thus no method has been developed that prepares 2-2 ferroelectric ceramic-filler composites that meet the requirements for 100 KHz to 12 GHz electronically scanned antenna applications.

Accordingly, it is an objective of the present invention to provide for methods of making ferroelectric (or paraelectric) ceramic-polymer composites with voltage-variable dielectric properties for use in fabricating electronically scanned antennas, and methods of making such antennas and components thereof.

SUMMARY OF THE INVENTION

To meet the above and other objectives, the present invention provides for a method of fabricating a porous ceramic polymer composite having voltage-variable dielectric properties. A polycrystalline ferroelectric powder, which is a ferroelectric perovskite such as barium strontium titanate, for example, is provided. The powder, a binder and a filler are then mixed in water to form a slurry. The powder-binder-filler slurry is then dried. The dried powder-binder-filler slurry is granulated. The granulated powder-binder-filler is pressed in a die. The binder and filler are then burned out to form a porous structure. The porous structure is then sintered to form porous ceramic parts. The porous ceramic parts are then machined into tiles. The machined porous tiles may then be tested for microwave properties.

A method is also provided for fabricating porous ferroelectric ceramic-polymer composite tiles comprising a subaperture blank for use in a continuous transverse stub electronically-scannable antenna. Porous tiles are provided. A fixture containing a plurality of porous tiles is assembled to form a subaperture. The assembly of porous tiles is then infiltrated with a polymer precursor. The assembly of infiltrated porous tiles is cured. The cured assembly is then machined to a predetermined flatness. A stub face of the assembly is then metallized. The metallized stub face is then attached to a support plate. The back face of the assembly is then metallized. The fully metallized assembly may then be tested.

A method is also provided for fabricating a continuous transverse stub electronically scanned antenna plate or subaperture from the composite tiles. A subaperture assembly that is attached to a support plate is provided. The back face of the subaperture assembly is machined. The back face of the subaperture assembly is then metallized. The back face of the subaperture assembly is then bonded to a cold plate. The stub face of the subaperture assembly is machined. Loads are then bonded to the subaperture assembly. The stub face of the subaperture assembly is metallized. The tops of the stubs are then lapped. A superstrate is then bonded to the subaperture. The superstrate is then machined. Acceptance tests may then be performed on the antenna plate.

The ferroelectric ceramic-polymer composite materials of the present invention possess a unique combination of properties required for electronically-scannable antennas operating at microwave frequencies, including large dependence of $\epsilon'$ on applied voltage (or large dielectric tunability), low loss tangent, and an $\epsilon'$ less than 50. The present invention utilizes a simple, low cost powder process for fabricating a sintered ceramic/polymer composite. The present invention provides for composite materials that the dielectric properties needed for use in continuous transverse stub electronically-scannable antennas.

The fabrication methods provided by the present invention include the following features: 1) formulation of a low-loss ferroelectric barium strontium titanate composition, 2) solution-gelation- or carbonate-derived raw material synthesis, 3) concurrent milling with binders and fugitive phase fillers, 4) filler and binder burn out and ceramic sintering to achieve a highly porous, connected barium strontium titanate ceramic structure, 5) infiltration with a low dielectric loss polymer, 6) adhesive bonding, machining, 7) metallization, and 8) the assembly and testing of the complete continuous transverse stub electronically scanned antenna aperture. The complete fabrication process, as well as several of the individual steps, constitute the novel approach to the preparation of voltage variable dielectric materials.

The continuous transverse stub electronically-scannable antennas developed by the assignee of the present invention requires a voltage-variable dielectric material for active scanning. This voltage-variable dielectric material must have a unique combination of properties including a large dependence of $\epsilon'$ on applied voltage (or large dielectric tunability), low loss tangent, and an $\epsilon'$ less than 50. Other than the invention described herein, no voltage-variable dielectric materials are known to exist that have the above properties.

The present invention provides the voltage-variable dielectric material that may be used to fabricate a continuous transverse stub electronically scanned antenna that operates in the 8–12 GHz frequency band. The properties achieved were a real permittivity of 29–30, an electric field induced percent change in the real permittivity (tunability) of >11% at 67 kV/cm, and an average loss tangent of 0.01. The present invention utilizes ceramic powder processing combined with the high purity benefits of solution-gelation-derived raw materials.

Low dielectric loss is the most difficult property to achieve while maintaining the desired tunability and real permittivity. In the present invention, low loss is achieved by controlling the composition, purity, porosity, pore size, connectivity, grain size, particle size distribution, crystallinity, type and purity of the infiltrating polymer, and the degree of cross-linking. The voltage-variable dielectric material provided by the present invention also facilitates the fabrication of phase shifters and time-delay devices for operation at microwave frequencies, varactors operating at RF frequencies, and "smart" skins for low-observable applications.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 is a flowchart showing a method of fabricating a porous ceramic with voltage-variable dielectric properties in accordance with the principles of the present invention;

FIGS. 2a and 2b are flowcharts showing methods of fabricating a subaperture blank for use in a continuous transverse stub electronically-scannable antenna; and FIG. 3 is a flowchart showing a method of fabricating a subaperture for use in a continuous transverse stub electronically-scannable antenna.

DETAILED DESCRIPTION

Figure 2A:
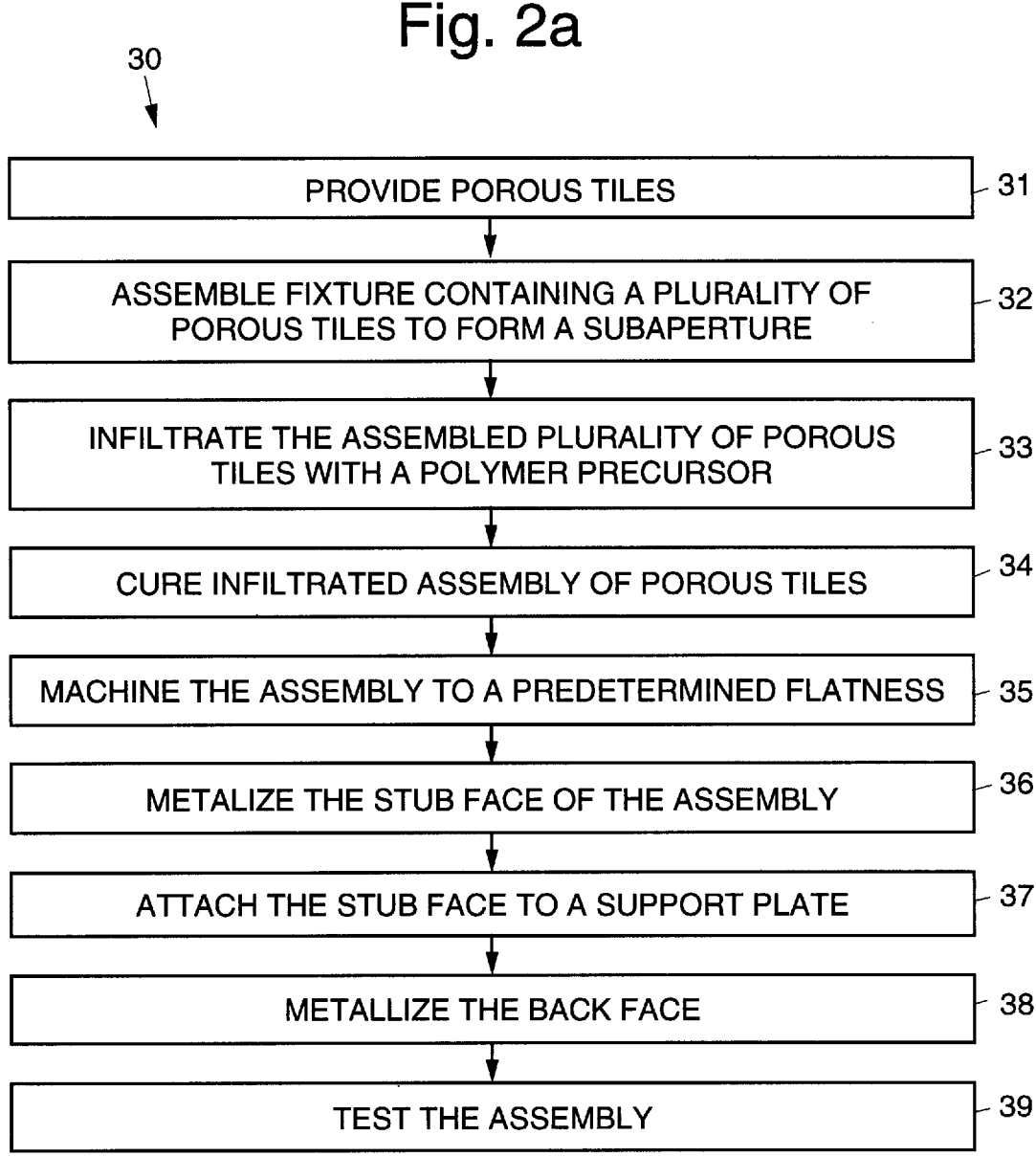

By way of introduction, a voltage-variable dielectric composite with a ferroelectric ceramic phase is needed that has the following structural features for use in 100 KHz to 12 GHz electronically scanned antennas. The desired structural features of the ferroelectric ceramic phase are that it is connected along the axis parallel to the applied electric field, has an open type of porosity, has a homogeneity that is <0.1% rms variation in density, the largest size of microstructural features is <10 $\mu$m in diameter, the volume fraction is 10–50% depending on the value of the real permittivity for the composite, its grain size is about 5 $\mu$m, its grain boundary thickness is <100 nm, its chemical purity is >99.9%, its crystal phase purity is >99%, and its moisture content is <0.1%. The desired structural features of the low dielectric, low loss filler phase are that it has a moisture content <0.1%, has a chemical purity >99.9%, and has a homogeneity <0.5% rms variation in density.

In accordance with the present invention, a 3-3 connectivity ferroelectric ceramic polymer composite is provided that meets these requirements for use in 100 KHz to 12 GHz electronically scanned antennas. The ferroelectric ceramic phase of this composite has a very uniform, small pore size microstructure with an open cell porosity in the range of 50% to 90%. The pores of this phase are filled with an appropriate low dielectric loss polymer to provide the novel 3-3 connectivity composite. The minimum pore size within this composite depends upon the maximum operating frequency of the electronically scanned antenna in which it is used. The pores and other scattering centers in the composite are small enough so that the diameter (d) of these centers is bounded in accordance the following expression $d \geq 0.05 c / f(\epsilon_c)^{1/2}$ where c is the speed of light, f is the operating frequency, and $\epsilon_c$ is the real permittivity for the composite. A maximum operating frequency of 12 GHz and a maximum $\epsilon_c$ equal to 50 implies that d should not exceed 177 $\mu$m.

The ferroelectric materials beneficially treated using the present invention are perovskites, which are characterized by the formula above. Well-known examples of such ferroelectric perovskites include $BaTiO_3$ and $Ba_xSr_{1-x}TiO_3$, where 0<x<1.

The 3-3 connectivity ferroelectric ceramic polymer composite is provided by a combination of solution-gelation (or other powder preparation methods, e.g. solid-state, hydrothermal, chemical precipitation) synthesis of ferroelectric powder, porous ceramic processing, and polymer infiltration. An overview of the process is shown in the flow-chart of FIG. 1.

More particularly, FIG. 1 is a flowchart showing a method 10 of fabricating a porous ceramic having voltage-variable dielectric properties in accordance with the principles of the present invention. In general, the method 10 comprises the following steps. A polycrystalline ferroelectric powder, which is a ferroelectric perovskite such as barium strontium titanate, for example, is provided 11. The powder, a binder and a filler are then mixed in water to form a slurry 12. The powder-binder-filler slurry is then dried 13. The dried powder-binder-filler slurry is granulated 14. The granulated powder-binder-filler is pressed 15 into a die. The binder and filler are then burned out 16 to form a fragile porous ash-like structure. The porous structure is then sintered 17 to form porous ceramic parts. The porous ceramic parts are then machined 18 into tiles. The machined porous tiles may then be tested 19 for microwave properties.

A multistep synthesis of a ferroelectric powder based on solution-gelation chemistry is described below for an exemplary ferroelectric material, $Ba_xSr_{1-x}TiO_3$, where 0<x<1. The salient aspects of each step are discussed below.

The present invention provides alcoholates of the respective metals employed in the ferroelectric material, and combines the metal alcoholates and subjects them to an equilibration reaction to form an equilibrated metal alcoholate solution. The equilibrated solution product hydrolyzes and condenses to form a gel. The gel is dried to form a powder with amorphous structure at 300–800 degrees Celsius. The powder is calcined at 600–1200 degrees Celsius for 1–24 hours. The calcined powder is milled using a wet vibratory mill, for example, in a plastic container with isopropyl alcohol and zirconia media for 12–72 hours. The milled powder is screened to obtain the proper particle size for preparation of a porous ceramic part.

Although the solution-gelation synthesis of ferroelectric powder is preferred, more conventional powder synthesis methods may be used to prepare the porous ferroelectric ceramic described herein. Conventional powder synthesis methods include solid-state reaction of carbonates and oxides, hydrothermal, precipitation, and other techniques well-known to those skilled in the art.

The metal alkoxide solution is synthesized as follows. The raw materials needed for solution-gelation processing of barium strontium titanate are shown below.

| Material | Purity |
| --- | --- |
| Barium (Ba) metal | >99.9% |
| Strontium (Sr) metal | >99.9% |
| Titanium alkoxide | >99.9% |
| Alcohol solvent | >99.9% |

Barium, strontium and dopant metals are dissolved in a stirred alcohol solvent at from 25°–100° C. The barium and strontium metals are reacted and dissolved with the alcohol to give $Ba^{2+}$ and $Sr^{2+}$ alcoholates. The alcohol 2-methoxyethanol is used in the preferred embodiment of the invention but other alcohols may be used. These cations are precursors to the formation of barium strontium titanate in the solution phase. The molar concentration ratio of Ba/Sr is x/(1-x), where x can vary between 0 to 1. Also, small concentrations of other metal species (dopants) may be added in this step.

Titanium alkoxide is added to a stirred solution at 25° to 50° C. The addition of the titanium alkoxide (the exemplary materials being titanium isopropoxide) to the alcohol solution containing the (x)$Ba^{2+}$ and (1-x)$Sr^{2+}$ cations completes the set of precursors needed to synthesize $Ba_xSr_{1-x}TiO_3$. The solution is refluxed and stirred under dry nitrogen gas at 135° C. The titanium alkoxide needs to be completely dissolved and equilibrated in the alcohol solution, along with the barium and strontium alkoxides, and so the solution is heated and stirred to the reflux temperature. A condenser is attached to the reaction flask to prevent the solvent from evaporating at the elevated temperature. A clear, light brown solution is obtained after about 1 to 4 hours of heating. The reaction is cooled to about room temperature.

Water is added to the stirred solution to initiate the hydrolysis reaction. The prior three steps address getting the barium strontium titanate chemical precursors into solution. The addition of water in a 3:1 water:alkoxide molar ratio initiates a hydrolysis/condensation reaction that starts to transform the solution into an amorphous gel. The gel structure is influenced by the acidity or basicity of the solution, as well as the temperature. Furthermore, gelation reaction rates can be accelerated through the use of ultrasonic agitation.

Amorphous barium strontium titanate gel/powder is formed. The hydrolysis, gel-forming reaction is continued for a period of time until the gel reacts to give an amorphous barium strontium titanate powder. The amorphous barium strontium titanate gel/powder is dried in air at 500°–800° C. to remove the alcohol solvent. The chemical composition of the barium strontium titanate gel is tested, as well as the thermal properties. The testing of the thermal properties provides information on the calcination temperature for the next step in the powder synthesis.

The amorphous barium strontium titanate gel powder is calcined at 600°–1200° C. The amorphous barium strontium titanate gel powder is transformed into crystalline barium strontium titanate powder during calcination. The extent of crystallization is tested through X-ray powder diffraction measurements, and the morphology of the powder through the use of a scanning electron microscope.

There are additional steps that may be taken to further process the calcined barium strontium titanate powder in the event that the grain sizes are not uniform. The calcined powder may be milled and screened to obtain a particle size consistent with production of the porous ferroelectric ceramic part. The calcined powder particle size distribution is reduced to the desired size by wet or dry milling in a rolling ball mill or in a vibratory mill. Other methods may be employed alternatively such as jet impact milling and air classification for a narrow particle size distribution. The time required for milling depends upon the starting size, the degree of calcination, and the milling method but generally ranges from 12 to 72 hours.

The most critical part of the fabrication process is the preparation of the porous ferroelectric ceramic. The two major categories of porous ceramics are reticulate ceramics and foam ceramics. A reticulate ceramic consists of interconnected, open voids within a continuous ceramic matrix; a foam ceramic has closed voids within the matrix. A reticulate ceramic is said to have an open-cell structure, while a foam ceramic has a closed-cell structure. Reticulate ceramics are therefore much more permeable than foam ceramics. The porous ferroelectric ceramic must be an open-cell (reticulate) ceramic, so that it can be filled with a polymer to form the composite.

The ferroelectric powder is mixed with binder and filler with the following weight percentages respectively: 0 to 10 and 10 to 80 weight %. The mixture is milled using a vibratory mill for 1–24 hours. The ground mixture is screened using between a −20 and −350 mesh sieve. The mixture is pressed to shape using the appropriate die and a pressure of 500–20,000 psi. The binder and filler are burned out under an ambient air or a controlled atmosphere to achieve a fragile porous structure; the temperature schedule for this step in the process is carefully controlled. The porous structure is sintered under a oxygen-rich atmosphere, wherein the temperature schedule for this step in the process is carefully controlled.

The required raw materials depends on the type of slurry that is prepared. The selection of the fugitive filler phase that defines the pore structure of the reticulate ceramic is a very important decision. This phase should volatilize, pyrolize or oxidize at a temperature below that required to sinter the ceramic, and should not leave behind any residue. High purity candidate materials include but are not limited to vinyl or polyvinyl alcohol, styrene or polystyrene, carbowax, Teflon, and carbon black.

The aqueous slurry is prepared as follows. The following materials are used.

| Material | Purity |
| --- | --- |
| barium strontium titanate powder | >99.9% |
| Filler, e.g., carbowax, Teflon, carbon or combinations of fillers | >99.9% |
| Binder, e.g., poly(vinyl alcohol) | >99.9% |
| Water | >99.9% |

The preparation of the barium strontium titanate powder-filler-binder slurry is a critical step in the fabrication process. The basic slurry is composed of finely divided crystalline particles, including the filler and binder. Water is the most common solvent, with a weight % ranging from 10% to 50%.

An exemplary formulation for an aqueous slurry (solid+solution) is as follows:

| Solid material (ceramic powder + filler) | Weight % | |
| --- | --- | --- |
| barium strontium titanate powder | 40–80 | |
| Filler (carbon) | 20–60 | =====> 50–70% |
| | 100 | |

The weight ratio of barium strontium powder to filler may range from 80:20 (4:1) to 40:60 (2:3). The weight percent of the solid materials in the slurry may range from 50–70 weight%. The remainder consists of a solution as defined below.

| Solution: (binder + solvent): | | |
| --- | --- | --- |
| Binder (polyvinyl alcohol) | 1–10 | |
| Water | 90–99 | =====>30–50% |
| | 100 | |

For example, if the solid material content of the slurry is 70 weight %, then the weight % of the solution is 30%. The aqueous slurry may also contain Theological, antifoaming, flocculating, or air-setting agents as additives.

The aqueous slurry is then milled. A typical milling procedure involves concurrently mixing and milling of the barium strontium titanate powder, binder, filler and solvent (i.e. deionized water or isopropyl alcohol) in a polyethylene jar with zirconia grinding media. The jars are ground for 0.1 to 10 hours on a vibratory mill or on a ball mill rack, for example.

The barium strontium titanate powder-filler-binder slurry is screened, chopped and dried. The slurry is dried to remove the solvent. Drying may be done in air at ambient temperature or in a conventional or microwave oven. Oven drying is typically performed in the temperature range of 60°–110° C. at durations of about 2 to 72 hours. Microwave drying is of shorter duration such as 10 to 120 minutes depending upon the batch size and the power level. The dried slurry is chopped and ground into discrete particles using an impact mill or another grinding device. This action is taken to prepare a powder that can be pressed into the form needed to fabricate a tile (described below). The chemical composition of the chopped powder is tested upon completion of this step. The chopped barium strontium titanate powder-polymer binder is screened in this step using a −100 mesh sieve to collect granules with diameters <100 μm. The granule size distribution is tested upon completion of this step using standard sieves.

The screened barium strontium titanate powder-filler-binder granules are pressed into shape in a steel die at room temperature using a pressure from 500–5000 psi depending upon the pressing characteristics of the granules. The fabrication of the properly-sized die is essential to this step. This fabrication occurs in parallel with the development of the tile fabrication process.

The fugitive phase is then burned-out. The thermal properties, e.g., thermogravimetric analysis and differential scanning calorimetry, of a test piece may be measured to help determine the optimal burn-out conditions.

The part produced in the preceding step is heated to burn out the filler and binder. The temperature selected for this step depends on the decomposition temperature for the fugitive phase. The duration of burn-out can vary depending upon the amount of filler or binder in the granules. Slow, controlled heating to the desired temperature is critical in this step because too high a heating rate may result in warping or cracking the unsintered ceramic structure. The oxygen content of the atmosphere in the oven during burn-out can be used to control the burnout if the decomposition mechanism of the filler is oxidative (pyrolysis or oxidation, thermal decomposition). It is emphasized that separate burn-out and sintering steps are important for precise control of the final reticulate structure.

An exemplary burn-out schedule of the fugitive phase filler and the binder is shown below, however deviations from the schedule are encompassed in the invention:

1) 4–12 hours to 120°–150° C.
2) 1–5 hours @ 120°–150° C.
3) 4–12 hours to 280°–350° C.
4) 1–5 hours @ 280°–350° C.
5) 1–4 hours to 400°–450° C.
6) 1–4 hours @ 400°–450° C.
7) 1–4 hours to 500°–550° C.
8) 1–4 hours @ 500°–550° C.
9) 1–4 hours to 600°–650° C.
10) 1–5 hours @ 600° to 650° C.
11) 4–8 hours to 25° C.

The barium strontium titanate ceramic is sintered at 1100°–1350° C. The thermal properties, (differential thermal analysis and differential scanning calorimetry) of one of the burned-out test pieces are measured to determine the optimal sintering conditions.

The fragile ceramic remaining after the burn-out of the fugitive phase is densified and strengthened by sintering. Sintering involves the fusing of the particles at elevated temperatures. Controlled heating is very important in this step to prevent the collapse of the ceramic matrix. The sintering temperatures generally range from 1100° C. to 1350° C. The exact temperatures, times, and gas composition within the furnace depend on the ceramic starting material and the desired final properties. The atmosphere in the furnace during sintering is oxygen-rich.

1) 0.5° to 5° C./minute to 1100°–1350° C.;
2) 1–6 hours @ 1100°–1350° C.;
3) 0.5° to 5° C./minute to 25° C.

The product of this step is a sintered, reticulate barium strontium titanate ceramic disk, square, or rectangular block.

Infiltration of the porous ferroelectric ceramic after sintering is performed to keep moisture out, to improve mechanical strength, and to reduce the dielectric loss of the composite. The polymer infiltration of porous (reticulate) ferroelectric ceramic may be achieved using an exemplary polymer such as cross-linked poly(styrene), for example, as described below. Moisture is removed from the porous ceramic by baking in a vacuum oven for about 1 to 24 hours at temperature of about 60° to 125° C. and vacuum less than 1 Torr. The ceramic is cooled to near room temperature then the liquid polymer precursor is introduced under a vacuum. The polymer is cured for 1–2 days at about 30° to 40° C., and additionally post-cured for 1 to 2 days from 60° to 125° C. The liquid polymer precursor should have a low viscosity so as to penetrate the ceramic pores to the maximum extent. The polymer precursor is selected to give a mechanically robust part and impart moisture resistance and minimum loss to the composite materials. One such formulation consists of 93 parts by weight styrene, 3 parts by weight low temperature peroxide initiator, and 4 parts per weight divinylbenzene.

Two methods 30, 40 for fabricating porous (reticulate) ferroelectric ceramicpolymer composite tiles are described below with reference to FIGS. 2a and for an exemplary ferroelectric material (barium strontium titanate). FIG. 2a is a flowchart showing a first method 30 of fabricating a subaperture for use in a continuous transverse stub electronically-scannable antenna.

The fabrication method 30 includes the following steps. Porous tiles are provided 31. A fixture containing a plurality of porous tiles is assembled 32 to form a subaperture. The assembly of porous tiles are then infiltrated 33 with a polymer precursor. The infiltration is achieved using a polymer precursor, such as styrene, a curing agent, such as divinylbenzene, and an initiator, such as organic peroxide (Esperox 33m TR). The infiltration is performed without breaking vacuum using a vacuum vessel that has a glass top through which styrene can be introduced into the vacuum vessel. The assembly of infiltrated porous tiles is cured 34. The assembly may be cured at atmospheric pressure by heat at from 32° to 40° C. for 20 to 40 hours. The assembly may be then heated at about 60° C. for 20 to 30 hours and from about 90° to 125° C. for 20 to 30 hours to completely cure it. The cured assembly is machined 35 to a predetermined flatness. A stub face of the assembly is then metallized 36.

The metallized stub face is then attached 37 to a support plate. The back face of the assembly is then metallized 38. The fully metallized assembly may then be tested 39.

As for the second method 40 shown in FIG. 2b, a porous ceramic part in its pre-machined pressed state is provided 41. The porous ceramic part is produced at step 17 in FIG. 1. In the method 40, the porous ceramic part is disposed in a vacuum 42. The porous ceramic part is then infiltrated 43 under vacuum. The infiltrated part is then cured 44. The cured infiltrated part is machined 45 to desired dimensions to form a tile that is used in a subaperture. Steps 41–45 are repeated 46 for each part that is to be used in the subaperture. The machined tiles are then assembled 47 to form the subaperture. Steps 36–39 described with reference to FIG. 2a are then performed.

Referring now to FIG. 3, a multistep method 50 for fabricating a continuous transverse stub electronically scanned antenna plate from the composite tiles is described below. FIG. 3 is a flowchart showing the method 50 of fabricating a subaperture for use in a continuous transverse stub electronically-scannable antenna. In general, the method 50 comprises the following steps.

A subaperture assembly that is attached to a support plate is provided 51. The back face of the subaperture assembly is machined 52. The back face of the subaperture assembly is then metallized 53. The back face of the subaperture assembly is then bonded 54 to a cold plate. The stub face of the subaperture assembly is machined 55. Loads are then bonded 56 to the subaperture assembly. The stub face of the subaperture assembly is metallized 57. The tops of the stubs are then lapped 58. A superstrate is then bonded 59 to the subaperture. The superstrate is then machined 60. Acceptance tests may then be performed 61 on the antenna plate.

Specifics details of an exemplary embodiment of the method 50 are as follows. Square tiles are machined 52 from the porous ferroelectric-polymer composite disc. A square tile of the appropriate dimensions is machined 52 from the porous ferroelectric ceramic-polymer composite disc. For example a 2.25 inch diameter disc yields a 1.25 inch ×1.25 inch square after sintering, infiltrating, and machining 52. In order to minimize the bond line between tiles after gluing them together, it is important that the tiles be machined to +/−0.001 inch accuracy.

Both sides of the square tile are then metallized 53. The square tile that is produced is metallized 53 on both sides for dielectric testing at 100 KHz. The metallization can be accomplished by sputtering gold on the surface of the tile. Several tests of composite test pieces may be performed at the completion of this step, including microstructure, connectivity, dielectric properties, mechanical properties, thermal properties, environmental properties, chemical properties, and manufacturing properties.

The tiles are selected and assembled for bonding. At this point, each tile has been characterized with regard to its dielectric properties, and is ready for selection and assembly into the continuous transverse stub electronically scanned antenna plate. The selection process is based on minimizing the discontinuity between the real permittivity from tile to tile. The tiles are then bonded 54. The adhesive is applied to the tiles, the tiles are then joined in a fixture, which holds them while curing the adhesive at 20° to 65° C. for 0.5 to 240 hours. Some grinding on a row of tiles may be necessary to make them fit together.

The bonded tiles are then machined to to form an assembled plate of tiles. Stubs are then machined 55 into the assembled plate of tiles. Loads are then bonded 56 to the assembled plate of tiles. The machined plate of tiles is then metallized 57. Both sides of the machined plate of tiles are metallized 57. The tops of the stubs are then lightly lapped 58 to remove the metal film. A superstrate is then bonded 59 to the machined plate of tiles. The machined plate of tiles is then machined 60. The plate is then ready for testing 61.

The final product is a 3-3 connectivity ferroelectric ceramic-polymer composite that is characterized by a ferroelectric volume fraction ranging from 10% to 50%, a uniform density throughout the volume of the part. The volume fraction of the ferroelectric ceramic phase depends on the real permittivity, loss tangent, and voltage-variable dielectric response sought for the 3-3 connectivity composite. A high/low ferroelectric ceramic volume fraction yields high/low values for the real permittivity, loss tangent, and voltage variable dielectric response.

The present invention overcomes difficulties associated with the prior art in general, and prior specific attempts at preparing 3-3 connectivity ferroelectric ceramicpolymer composites through (1) the use of relatively high purity starting materials (ferroelectric ceramic powder, binder, filler) with purities exceeding 99.9%, (2) solution-gelation synthesis of the ferroelectric powder, (3) minimization of introducing impurities during the processing of the porous ferroelectric ceramic, (4) infiltration of a pure, low dielectric loss polymer that keeps out moisture and adds mechanical strength to the composite, and (5) integration of testing procedures at key steps in the fabrication process. Fabrication of the 3-3 connectivity ferroelectric ceramic-polymer composite using the above-described methods permits preparation of a high volume fraction, very uniform, small size pore structure that can be formed into the desired shape. The solution-gelation process for the synthesis of the ferroelectric powder permits the fabrication of an ultrapure material with exact control over the stoichiometry of the chemical composition of the ferroelectric ceramic. The high purity together with the stoichiometry control and small pore size provide a means of achieving low loss at the operational frequencies for the electronically scanned antenna.

The 3-3 connectivity ferroelectric ceramic-polymer composite of the present invention overcomes the lack of interconnectivity associated with prior art structures at porosities in the range of 70% to 80% (or a ferroelectric volume fraction of 30% to 20%) with a fully connected ceramic structure.

The homogeneity problem of prior art porous ferroelectric ceramics is minimized by the careful preparation of the mixtures of the ferroelectric powder, binder and filler, the pressing of the mixture, and the burn-out and sintering. Steps are taken to prevent impurities from entering the ceramic during the process.

The 3-3 connectivity ferroelectric ceramic-polymer composite has microstructural features of such size so as to minimize the scattering of electromagnetic radiation over the frequency range of 100 KHz to 12 GHz.

Measured dielectric properties of two porous barium strontium titanate ceramicpolymer composite parts are summarized in the table below. Tuning was measured at an applied electric field of 40 kV/cm and at a frequency of 100 KHz. It is assumed that $\epsilon'=30$ for the calculation of the total scan angle. The measured % tunability values for an applied electric field of 40 kV/cm were used.

| Part No. | v(GHz) | $\epsilon'$ | loss tan | Loss (dB/in) | Tun.(%) | Scan angle(°) |
|---|---|---|---|---|---|---|
| 137F27 | 8.3 | 28.7 | 0.014 | 1.4 | 4.75 | +/−3.8 |
| | 7.6 | 24.7 | 0.013 | 1.2 | 4.75 | +/−3.8 |
| | 3.9 | 29.2 | 0.0069 | 0.33 | 4.75 | +/−3.8 |
| | 2.1 | 31.8 | 0.0029 | 0.08 | 4.75 | +/−3.8 |
| | 0.9 | 30.1 | 0.0026 | 0.03 | 4.75 | +/−3.8 |
| 137F30 | 8.3 | 31.6 | 0.014 | 1.5 | 9.5 | +/−7.7 |
| | 7.6 | 32.3 | 0.014 | 1.4 | 9.5 | +/−7.7 |
| | 3.1 | 33.8 | 0.0055 | 0.23 | 9.5 | +/−7.7 |

Thus, improved ferroelectric (or paraelectric) ceramic-polymer composites with voltage-variable dielectric properties for use in fabricating electronically scanned antennas and methods of making same have been disclosed. It is to be understood that the described embodiment is merely illustrative of some of the many specific embodiments which represent applications of the principles of the present invention. Clearly, numerous and varied other arrangements may be readily devised by those skilled in the art without departing from the scope of the invention.

What is claimed is:

1. A method of fabricating a radiating structure for use in a continuous transverse stub electronically-scannable antenna, said method comprising the steps of:

providing porous tiles;

assembling a fixture containing a plurality of porous tiles;

infiltrating the assembly of porous tiles with a polymer precursor to form a ceramic polymer composite;

curing the assembly of infiltrated porous tiles;

machining the cured assembly;

metallizing a stub face of the assembly;

attaching the metallized stub face to a support plate; and metallizing a back face of the assembly to form a radiating structure.

2. The method of claim 1 wherein the step of providing porous tiles comprises the steps of:

providing a polycrystalline ferroelectric powder;

mixing the powder, a binder and a filler in water to form a slurry;

drying the powder-binder-filler slurry;

granulating the dried powder-binder-filler slurry;

pressing the granulated powder-binder-filler into a die;

burning out the binder and filler to form a porous structure;

sintering the porous structure to form porous ceramic parts; and machining the porous ceramic parts to provide the porous tiles.

3. The method of claim 2 wherein the polycrystalline ferroelectric powder is a ferroelectric perovskite.

4. The method of claim 2 wherein the ferroelectric perovskite is barium strontium titanate.

5. The method of claim 2 further comprising the step of testing the machined porous tiles for microwave properties.

6. The method of claim 1 further comprising the step of testing the metallized assembly.

7. The method of claim 1 wherein the step of infiltrating the assembly of porous tiles comprises the step of infiltrating the porous ceramic part under vacuum.

8. The method of claim 1 further comprising additional steps required to form a continuous transverse stub electronically-scannable antenna, said additional steps comprising:

bonding the back face of the assembly to a cold plate;

bonding loads to the assembly;

lapping tops of the stubs;

bonding a superstrate to the assembly; and machining the superstrate to form the continuous transverse stub electronically-scannable antenna.

* * * * *